United States Patent [19]

Fujimoto

[11] Patent Number: 4,562,360
[45] Date of Patent: Dec. 31, 1985

[54] MOBILE SUBSTATION

[75] Inventor: Tsunetomo Fujimoto, Itami, Japan

[73] Assignee: Mitsubishi Denki Kabushiki Kaisha, Japan

[21] Appl. No.: 432,809

[22] Filed: Oct. 5, 1982

[30] Foreign Application Priority Data

Oct. 13, 1981 [JP] Japan ............................ 56-152568[U]

[51] Int. Cl.⁴ ............................................. H02B 5/04
[52] U.S. Cl. ..................................... 307/149; 336/65; 361/333
[58] Field of Search ........................... 307/9, 149, 154; 361/333, 340, 335, 65; 191/66

[56] References Cited

U.S. PATENT DOCUMENTS

| 776,374 | 11/1904 | Arnold | 307/149 |
| 2,237,812 | 4/1941 | Blierex | 361/333 |
| 4,367,512 | 1/1983 | Fujita | 361/335 X |

FOREIGN PATENT DOCUMENTS

| 269328 | 1/1914 | Fed. Rep. of Germany | 336/65 |
| 231964 | 8/1944 | Switzerland | 336/65 |

OTHER PUBLICATIONS

Advertisement of Porter Company, Inc. in Transmission & Distribution, p. 35, Dec. 1980.
Advertisement by Porter Company, Inc. in Transmission & Distribution, p. 155, Mar. 1981.

Primary Examiner—J. R. Scott
Assistant Examiner—T. DeBoer
Attorney, Agent, or Firm—Leydig, Voit & Mayer, Ltd.

[57] ABSTRACT

This invention relates to a mobile substation wherein constituent equipment of a substation are made movable by carrying them on a chassis of said mobile substation, and in a predetermined site, the substation is connected from a first terminal to a receiving line and from a second terminal to a feeder line wherein a pair of supporting devices is provided each of which has its one end turnably coupled with the chassis, and which can support the receiving line and the feeder line with their other ends corresponding to the respective terminals, when they are fixed to the chassis at predetermined positions.

1 Claim, 3 Drawing Figures

MOBILE SUBSTATION

BACKGROUND OF THE INVENTION

This invention relates to a mobile substation.

Mobile substations usually adopt a system wherein equipment constituting the substation, such as a transformer and a switchgear, are carried on a trailer and are collectively transported.

A prior-art mobile substation is as shown in FIG. 1. A chassis 1 is supported by wheels 2 so as to construct a trailer 3. A gas-insulated switchgear 4, a transformer 5, a low-voltage cubicle 6, etc. are collectively carried on the chassis 1. The substation can be transported by attaching it to a tractor and driving it to a desired site. In order to permit the structure to function as the substation, however, a high-voltage side terminal 7 and a low-voltage side terminal 8 need to be respectively connected to a receiving line 9 and a feeder line 10. To accomplish this, supporting devices 15, 16 which consist of steel structures 11, 12 and porcelain insulators 13, 14 are used for insulatingly supporting the receiving line 9 and the feeder line 10. Accordingly, the erection of the supporting devices 15, 16 is carried out separately from the equipment. This leads to the disadvantages that expenses for transportation and foundation work increase and that the construction term of the whole substation is lengthened.

SUMMARY OF THE INVENTION

This invention has been made in order to eliminate the disadvantages mentioned above, and provides a mobile substation having two supporting devices wherein one end of each of said supporting devices is pivotally coupled to the chassis of a trailer, and the other ends of which are used for supporting a receiving line and a feeder line respectively, whereby the transportation of said supporting devices is facilitated, and the foundation work therefore can be dispensed with.

BRIEF DESCRIPTION OF THE DRAWINGS

In the drawings, the same symbols indicate the same or corresponding parts.

DESCRIPTION OF THE PREFERRED EMBODIMENT

Figure 1:
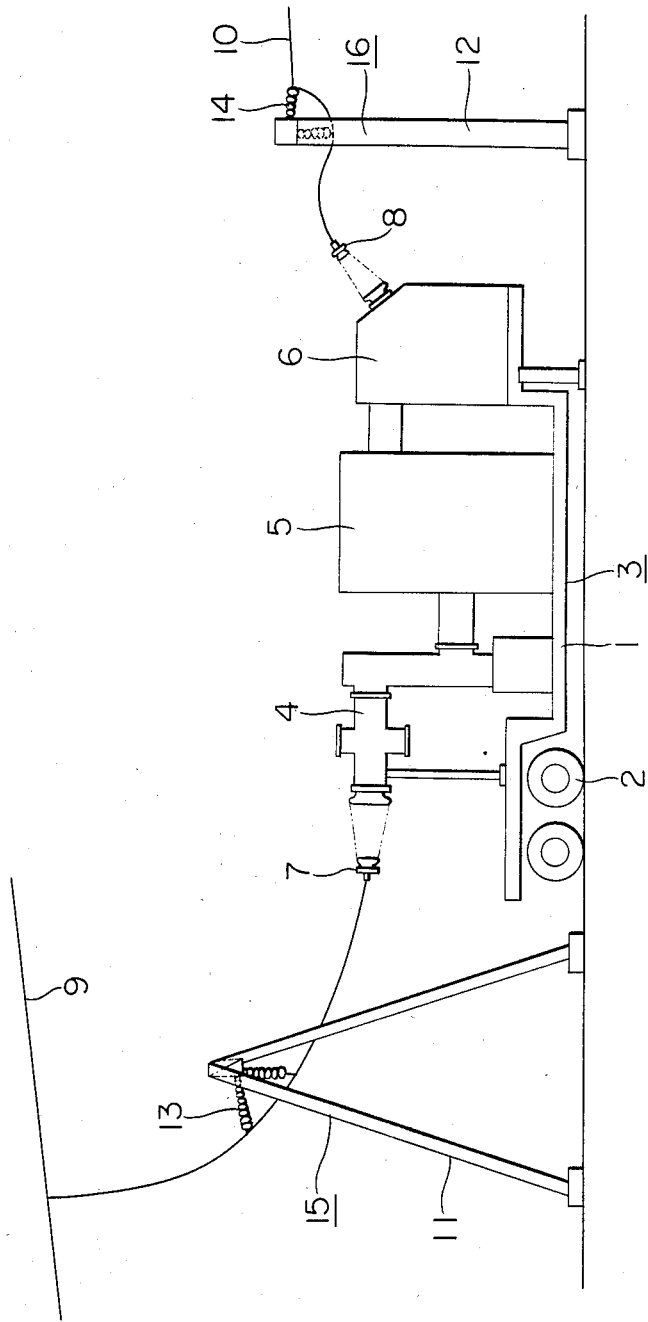
FIG. 1 is a front view showing a prior-art mobile substation.
Figure 2:
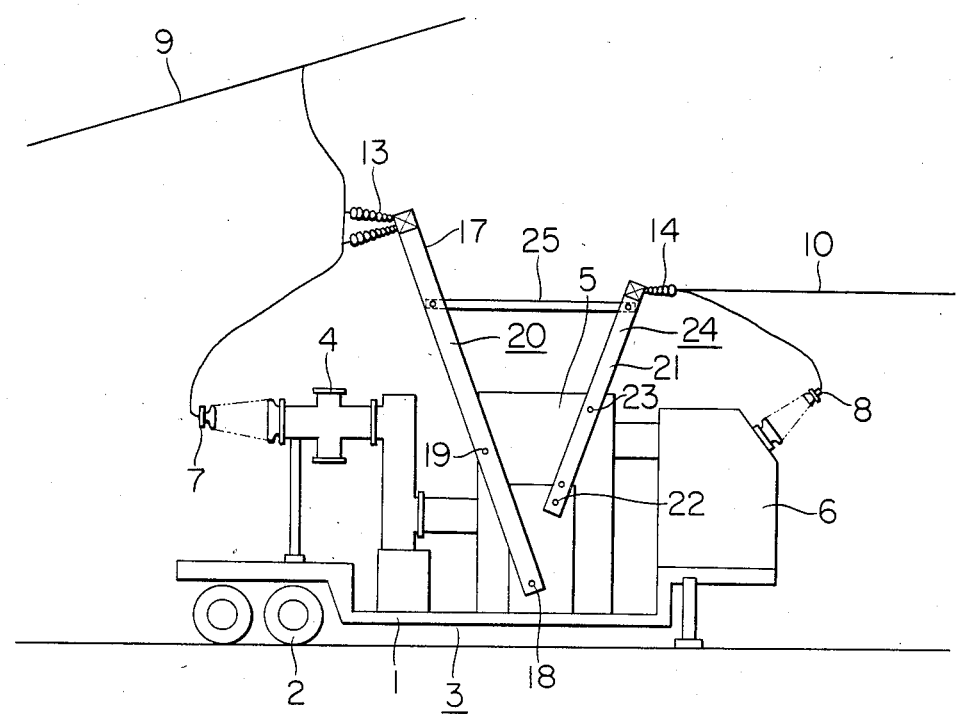
FIG. 2 is a front view showing an embodiment of this invention.

Hereunder, the present invention will be described with reference to the drawings. In FIG. 2, parts 1 to 10, 13 and 14 are the same as in the prior art of FIG. 1. A steel structure 17 has one end pivotally coupled with the chassis 1 through the transformer 5 by a shaft 18, and can be fixed to the transformer 5 by a bolt 19. The parts 13 and 17 to 19 constitute a supporting device 20, which can support the receiving line 9. Steel structure 21 has one end pivotally coupled with the chassis 1 through the transformer 5 by a shaft 22, and can be fixed to the transformer 5 by a bolt 23. The parts 14 and 21 to 23 constitute a supporting device 24, which can support the feeder line 10. A coupling member 25 is used to join both the steel structures 17 and 21.

Figure 3:
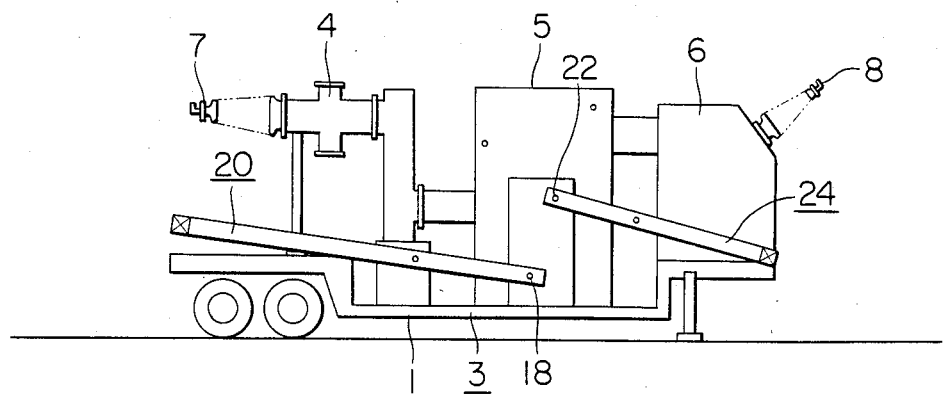
FIG. 3 is a front view showing the state of the embodiment of FIG. 2 during transportation.

When the trailer 3 thus constructed is moved, both the supporting devices 20 and 24 are turned to predetermined positions so as to facilitate transportation, as illustrated in FIG. 3. When the trailer has reached the site of the substation, both the supporting devices 20 and 24 are raised to predetermined angles about the shafts 18 and 22, fixed by the fixtures 19 and 23 and joined by the coupling member 25, as illustrated in FIG. 2.

According to this invention, one end of each of the supporting devices is pivotally coupled with the chassis, and the supporting devices are fixed to the chassis at predetermined positions so as to support the receiving line and the feeder line at their respective other ends. Thus, the supporting devices are lowered during the transportation of the mobile substation so as to facilitate the transportation, and the foundation work is dispensed with the building site of the substation, so that the construction time of the substation can be sharply shortened.

What is claimed is:

1. In a mobile substation having equipment including a transformer, a high voltage side first terminal and a low voltage side second terminal, and a wheeled chassis supporting said equipment for movement from site to site, said first terminal being adapted for connection to a receiving line and said second terminal being adapted for connection to a feeder line, the improvement comprising:

a pair of supporting devices separate and spaced from each other, each of which has one end pivotally coupled with said chassis to support said devices for independent pivotable movement between lowered and erected positions, one of said devices being provided, when erected, to support said receiving line and the other of said devices being provided, when erected, to support said feed line by the respective other ends of said devices corresponding to the respective terminals, means for fixing to said chassis a portion of each of said devices spaced from the one end pivotally coupled with said chassis for supporting each of said devices in predetermined erected positions, and coupling means connected between said devices independent of said wheeled chassis for fixing said devices spaced from each other and in the predetermined erected positions.

* * * * *